Jan. 24, 1939. A. W. TONDREAU 2,145,033
CAMERA DOLLY
Filed Nov. 22, 1935 6 Sheets-Sheet 4
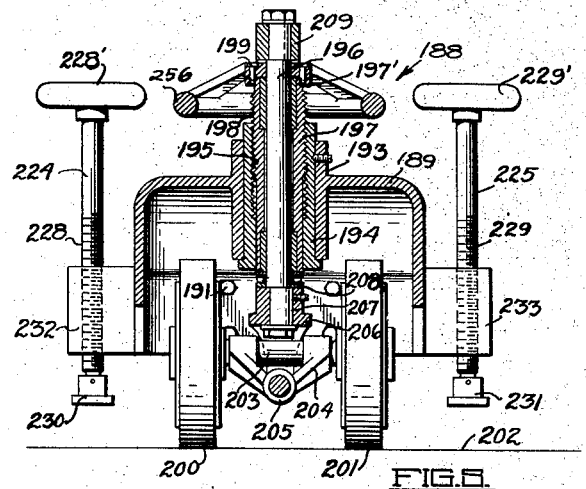
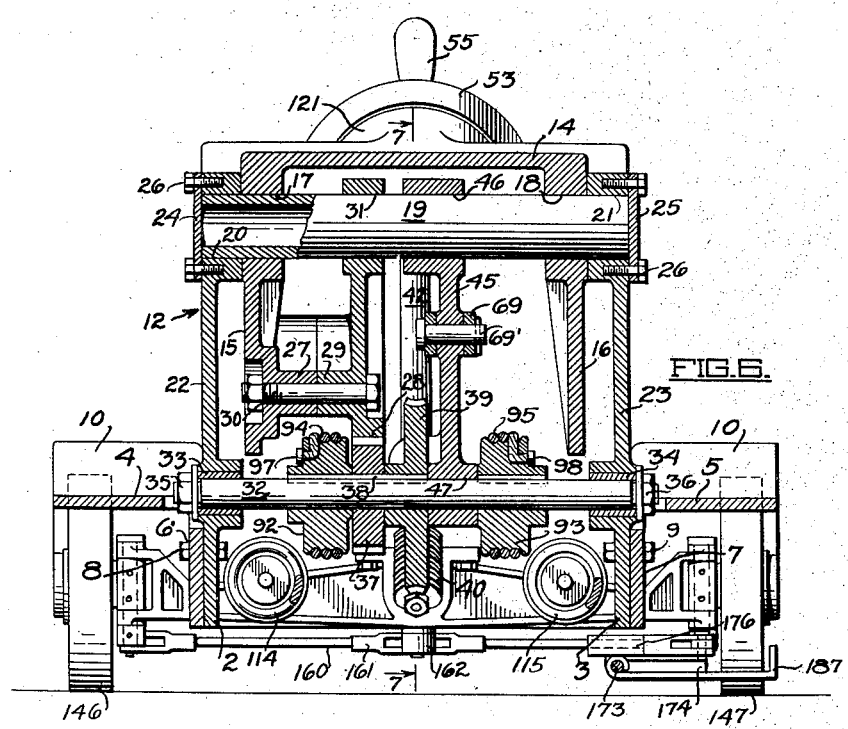
INVENTOR
ALBERT W. TONDREAU
BY
ATTORNEY

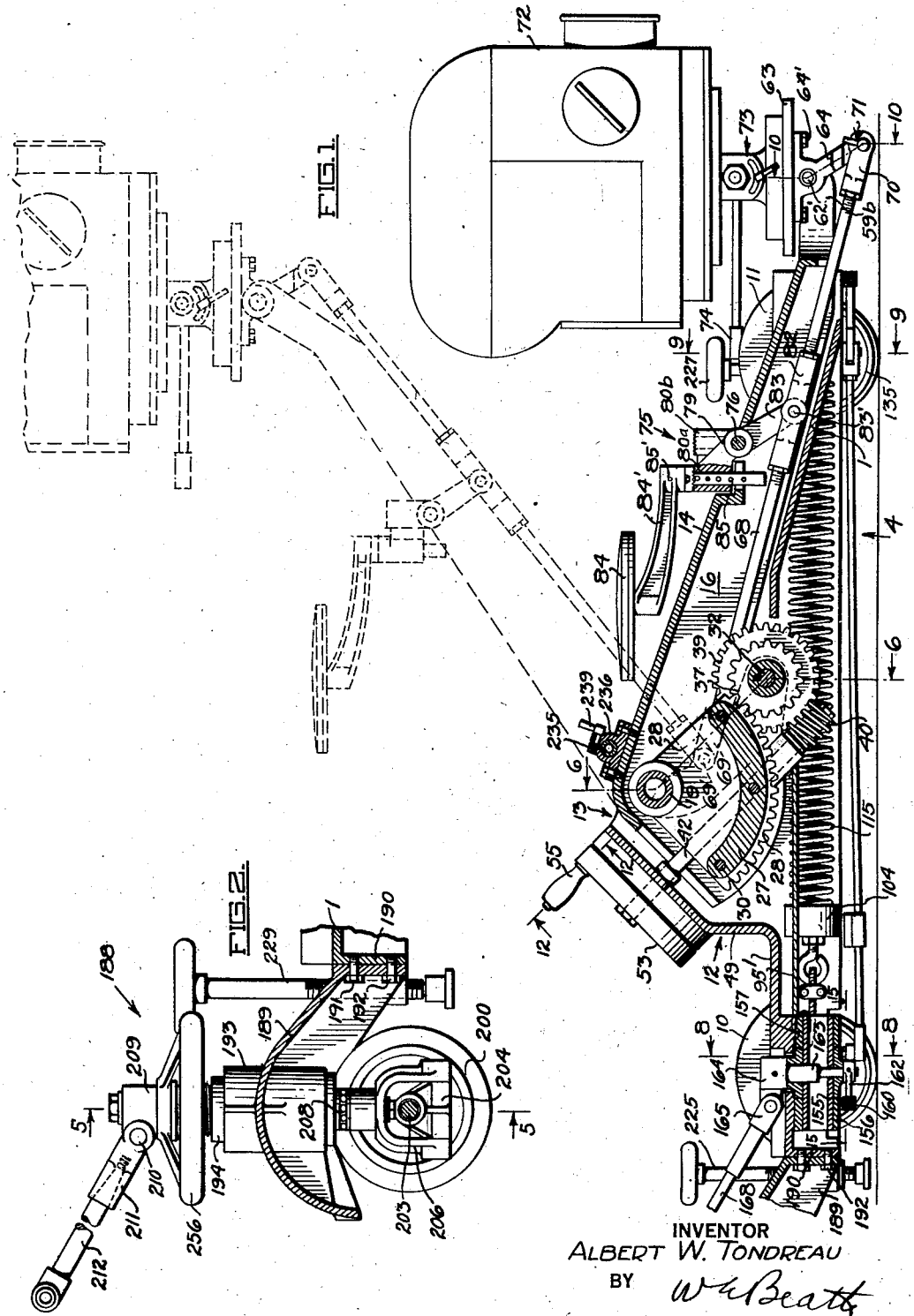
Jan. 24, 1939.  A. W. TONDREAU  2,145,033
CAMERA DOLLY
Filed Nov. 22, 1935   6 Sheets-Sheet 1
INVENTOR
ALBERT W. TONDREAU
BY
ATTORNEY Jan. 24, 1939.  A. W. TONDREAU  2,145,033
CAMERA DOLLY
Filed Nov. 22, 1935    6 Sheets-Sheet 2
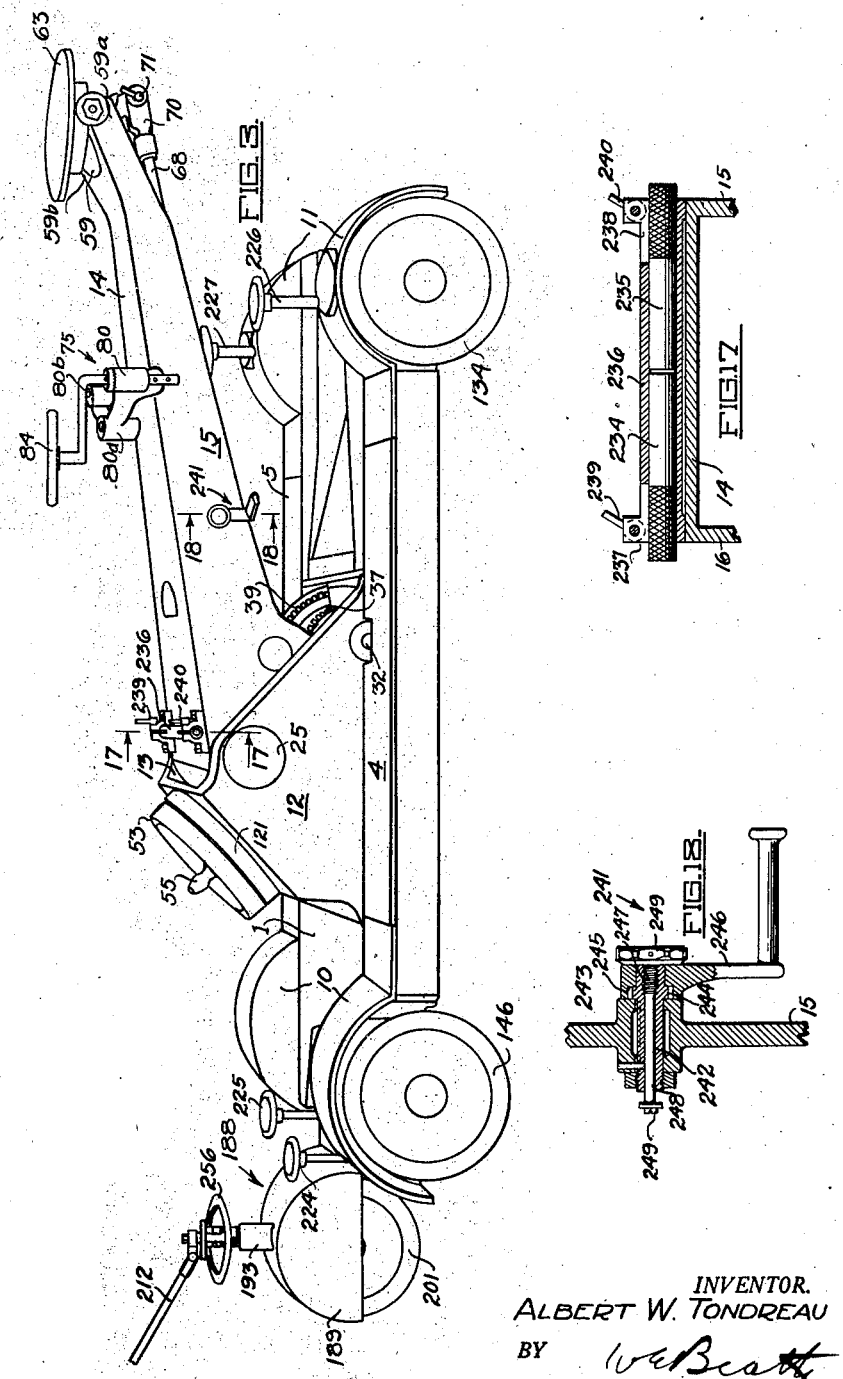
INVENTOR.
ALBERT W. TONDREAU
BY
ATTORNEYS.

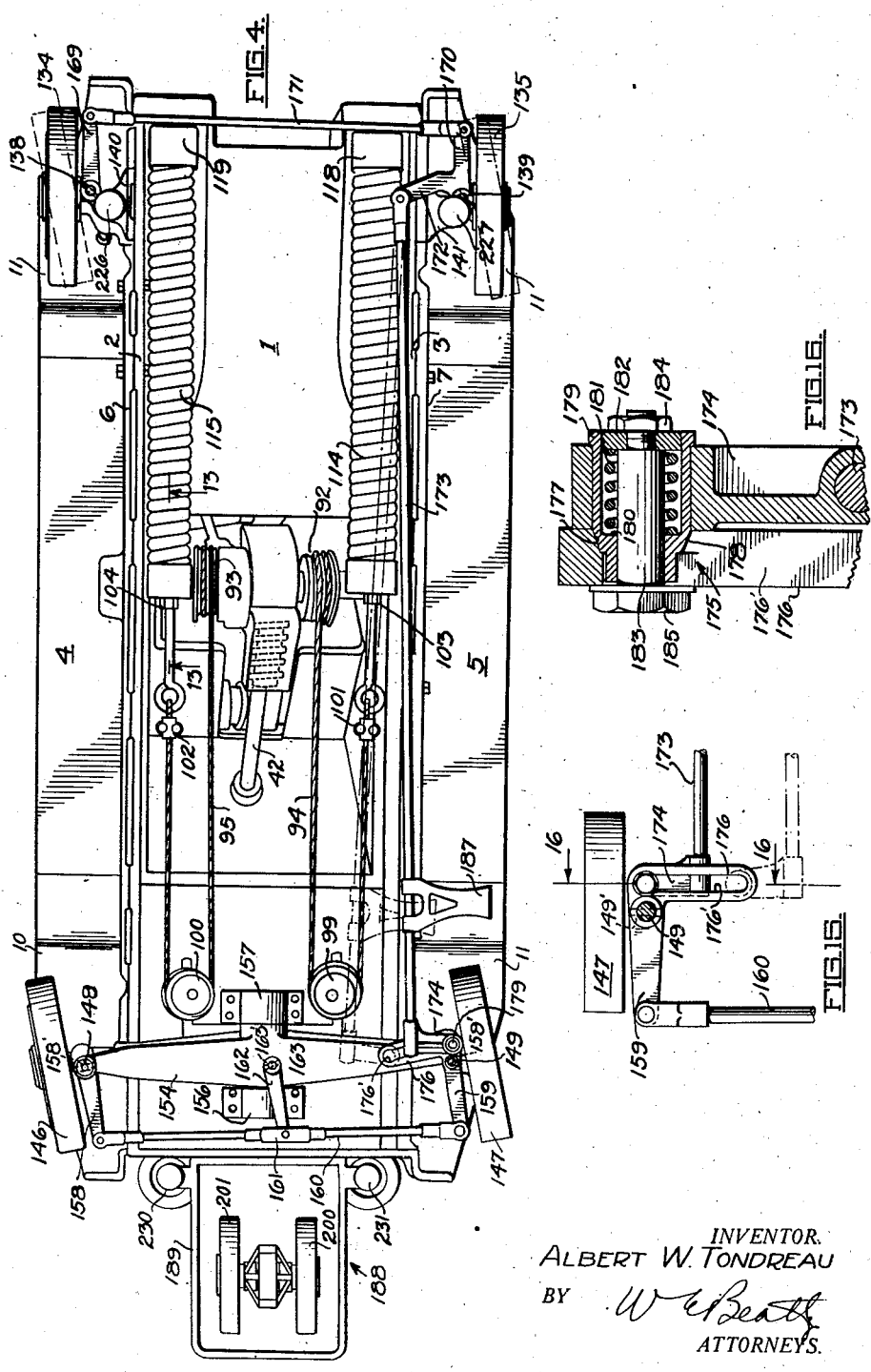

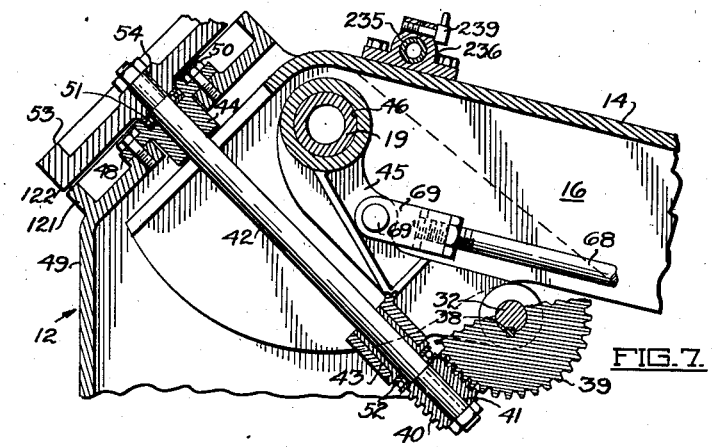
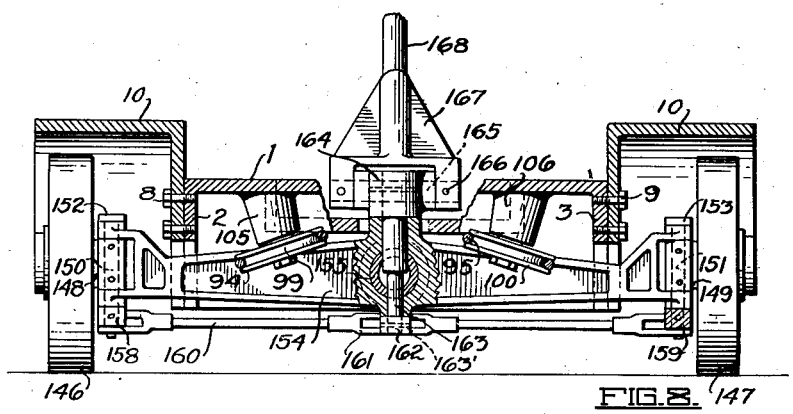
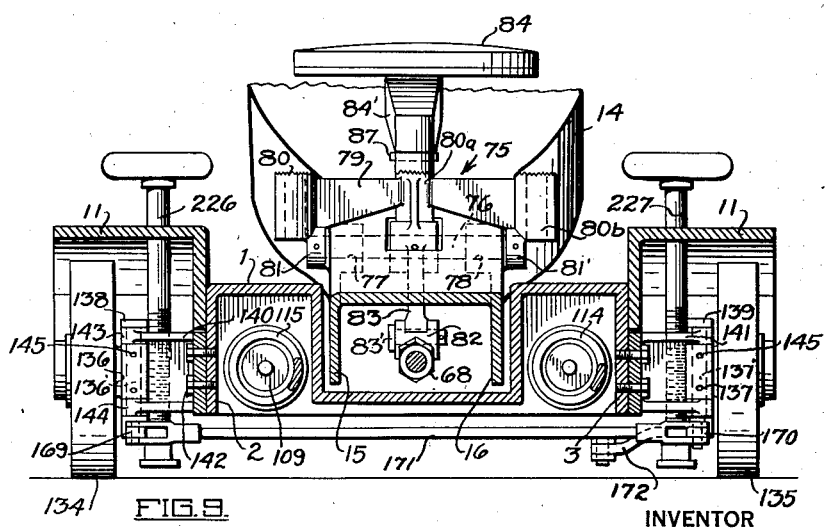
INVENTOR
ALBERT W. TONDREAU

Jan. 24, 1939.   A. W. TONDREAU   2,145,033
CAMERA DOLLY
Filed Nov. 22, 1935   6 Sheets-Sheet 6

INVENTOR
ALBERT W. TONDREAU
BY
ATTORNEY

Patented Jan. 24, 1939

2,145,033

UNITED STATES PATENT OFFICE 2,145,033

CAMERA DOLLY

Albert W. Tondreau, Glendale, Calif., assignor to Warner Bros. Pictures, Inc., New York, N. Y., a corporation of Delaware Application November 22, 1935, Serial No. 51,176

13 Claims. (Cl. 254—2)

This invention relates to a camera dolly or boom for supporting and transporting a motion picture camera while in operation preferably for the making of the so-called "running shots" and the like.

In photographing moving picture scenes it is often necessary to follow the action by moving the camera along with the actors being photographed or by moving the camera vertically above or below the actors to get certain desired effects.

In making running shots of this kind it is essential that the camera be moved smoothly without jarring and that the cameraman be maintained in a convenient position to operate the camera in any elevated position of the camera and whether or not the camera is being raised or lowered during the photographing operation so that he may always direct his undivided attention to the operation of the camera during photographing.

One object of the invention is to provide a camera dolly wherein a smooth and steady vertical movement is imparted to a camera supported thereby.

Another object of the invention is to enable a cameraman and camera carried by a camera dolly to be manually raised and lowered.

Another object of the invention is to enable a camera carried by a camera dolly to be lowered to a photographing position close to the floor.

Another object is to maintain the cameraman in a convenient position relative to the camera regardless of the position of the camera.

The invention contemplates a camera dolly having a wheeled truck on which a camera supporting arm is pivoted for movement in a vertical direction. A seat for supporting the cameraman is also provided on the camera supporting arm with linkage for maintaining the seat and camera in parallel relationship regardless of the position of the arm. Suitable gearing is provided to permit the camera supporting arm to be raised by hand. Counterbalancing springs are provided to counterbalance the weight of the camera and cameraman whereby they may be easily and smoothly raised or lowered.

The wheeled truck has a U-shaped channel formed therein in the path of movement of the camera supporting arm whereby the arm, and consequently the camera, may be moved to a lowermost position close to the floor.

For further details of the invention reference may be had to the following specification taken in conjunction with the accompanying drawings wherein:

Figs. 1 and 2 illustrate a longitudinal section through a camera dolly constructed in accordance with the present invention.

Fig. 3 is a perspective view of the camera dolly.

Fig. 4 is a bottom plan view looking in the direction of the arrow 4 (Fig. 1) and showing the steering arrangement.

Fig. 5 is a sectional elevation view of the fifth wheel arrangement and is taken along the line 5—5 of Fig. 2.

Fig. 6 is a transverse sectional elevation view of the mechanism for elevating the camera carrying arm and is taken along the line 6—6 of Fig. 1.

Fig. 7 is a fragmentary sectional view taken along the line 7—7 of Fig. 6.

Fig. 8 is a transverse sectional view of the rear of the camera dolly and is taken along the line 8—8 of Fig. 1.

Fig. 9 is a transverse sectional view of the front end of the camera dolly and is taken along the line 9—9 of Fig. 1.

Fig. 15 is a plan sectional view of the link arrangement for moving the front wheel steering arrangement into operating position and is taken along the line 15—15 of Fig. 1.

Fig. 16 is a sectional view taken along the line 16—16 of Fig. 15 and shows a means for moving the front wheel steering rod into operating position with the steering arrangement for the rear wheels.

Fig. 17 is a sectional view through the telescoping handle bars and is taken along the line 17—17 of Fig. 3.

Fig. 18 is a sectional view of the adjustable foot rests and is taken along the line 18—18 of Fig. 3.

Figure 10:
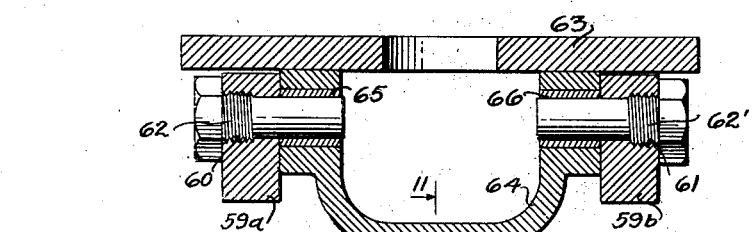
Fig. 10 is a transverse sectional view through the forward end of the camera carrying arm and is taken along the line 10—10 of Fig. 1.

Referring now to Figs. 3, 6, 8, and 9 the camera dolly comprises a main body frame or casting 1 of irregular outline which has a pair of depending flanges 2 and 3 on either side thereof. A pair of running boards 4 and 5 is provided on either side of the main body portion 1 having downwardly extending flanges 6 and 7 which are secured to the flanges 2 and 3 as by bolts 8 and 9. The ends of the running boards 4 and 5 merge into fender pieces 10 and 11 which are also secured to the main body 1.

Camera arm actuating mechanism

A housing 12 is provided near the central portion of the body 1 and has its forward end open as at 13 to receive and rotatably support the rear end of a load or camera supporting member or arm 14. The arm 14, in cross section, is in the shape of an inverted U having downwardly extending flanges 15 and 16 (Figs. 6 and 9). The rear of the arm 14 has a pair of bearing portions 17 and 18 (Fig. 6) which are journaled upon a transverse tubular shaft 19. The shaft 19 is mounted in apertures 20 and 21 provided in the side walls 22 and 23 of the housing 12 and is secured in position by means of end plates 24 and 25. Bolts 26 secure the end plates 24 and 25 to the end walls of the housing. The left-hand flange 15 of arm 14 is provided with an enlarged arcuate boss 27 concentric with the tubular shaft 19 (Figs. 1 and 6). A segmental spur gear 28 constituting a power arm for the load arm 14 has a similar arcuate boss 29 and is secured to the boss 27 through bolts 30. The upper portion of the gear 28 has an aperture 31 therein which is mounted over the shaft 19.

Figure 12:
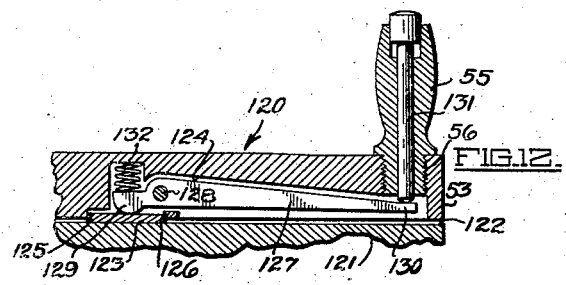
Fig. 12 is a sectional view of the automatic brake for holding the camera carrying arm in locked position and is taken along the line 12—12 of Fig. 1.

A secondary shaft 32 is provided below and forward of the shaft 19 and is rotatably secured within bearings 33 and 34 provided in the side walls 22 and 23 of the housing 12. The ends of the shaft 32 are threaded to receive nuts 35 and 36 which prevent longitudinal movement of the shaft 32. A spur gear 37 is secured to the shaft 32 by means of a key 38 and meshes with the segmental gear 28. Also secured to shaft 32 by the key 38 is a worm gear 39 (Figs. 1, 6 and 7). The gear 39 is engaged by a worm 40 secured by a key 41 to the lower end of the shaft 42 which is rotatably mounted within bearings 43 and 44. The bearing 43 is provided on a bottom portion of a floating link 45. Link 45 as shown in Fig. 6 has an aperture 46 at its upper end which is fitted over the shaft 19. The lower end is provided with a bearing portion 47 mounted over the shaft 32. The upper bearing 44 is formed in a separate piece having a flange 48 which rests against an annular shoulder provided on the rear wall 49 of the housing 12 and is secured thereto by bolts 50. Thrust bearings 51 and 52 are provided near either end of the shaft 42 to take up the thrust imposed by the worm 40. The upper portion of shaft 42 has a disk 53 rigidly secured thereto as by a key 54. A handle 55 (Figs. 1 and 12) is secured to the outer portion thereof as by the threaded connection 56. Rotation of the handle 55 in either direction, it will be understood, causes angular movement of the arm 14 and consequently vertical motion of the camera.

In order to lock the arm 14 in any angular position and prevent its changing this position due to vibration or added weight, a braking mechanism generally indicated at 120 (Fig. 12) is provided. As will be seen in Fig. 7, the rear wall 49 of the housing 12 is provided with a circular shoulder 121 adjacent the periphery of the disk 53. The upper surface 122 of the shoulder 121 serves as a braking surface which is adapted to be engaged by a friction block 123 provided within a notched portion 124 of the rim of disk 53. The block 123 is adapted to be moved between guide surfaces 125 and 126. A lever 127, pivotally mounted upon a pin 128, is also provided within the notch 124 and has one end 129 engageable with the block 123. The other end 130 of the lever 127 is engaged by a plunger 131 slidably mounted within a longitudinal bearing formed through the handle 55. A compression spring 132, placed over the end 129 of the lever 127, normally holds the brake block 123 into frictional engagement with the surface 122 of the shoulder 121. When the plunger 131 is pressed by the thumb of the operator, the brake is released to allow rotation of the handle 55.

Referring now to Figs. 1, 3 and 10, the arm 14 has a yoke 59 formed at its forward end. The projections or arms 59a and 59b of the yoke 59 are provided with threaded apertures 60 and 61 through which are screwed bearing studs 62 and 62'. A camera plate 63 is secured to a pair of vertically extending projections of a yoked member 64 as by bolts 64'. Bearings 65 and 66 provided in the member 64 are journaled over the studs 62 and 62'. A depending projection on the bottom portion of the yoke 64 extends downward into a bearing 67.

Parallel motion linkage

In order to maintain the camera plate 63 in parallel relationship at all angles of the camera supporting arm 14, I provide a link 68 (Figs. 1 and 7). One end of the link 68 has a clevis 69 (Fig. 7) which is pivotally secured by a pin 69' to the link member 45 at a point intermediate its ends. The other end has a similar clevis 70 (Figs. 1 and 10) which is pivotally supported adjacent the bearing 67 by an eccentric arrangement 71 which will be described in detail hereinafter. Due to the fact that the center distances between the tubular shaft 19 and pin 69' at one end and the bearing 62 and eccentric 71 at the other are normally the same distance apart, the camera plate 63 will remain in a horizontal position regardless of the position of the camera arm 14 assuming, of course, that the dolly is in a horizontal position.

The camera which is shown as being mounted within a soundproof casing 72 is preferably mounted upon a camera free-head 73 which allows pivoting of the camera about a horizontal or vertical axis in respect to the camera plate 63. A handle 74 is provided to pivot the camera 72.

Seat adjustment

Figure 14:
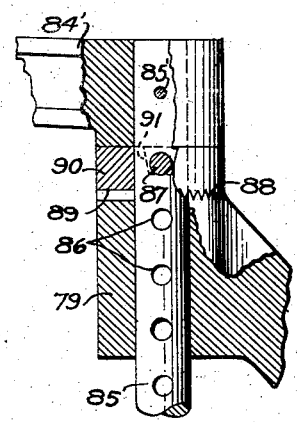
Fig. 14 is a fragmentary view of the means for adjusting the position of the camera operator's seat.

Along the central portion of the arm 14 is provided a seat arrangement generally indicated at 75 (Figs. 1 and 9). A transverse horizontal shaft 76 is journaled near its ends within bearings 77 and 78, provided on the side flanges 15 and 16 of the arm 14. A casting 79 is provided having spaced vertical sockets 80, 80a, and 80b therein. Depending lugs 81 and 81' on either side are rigidly secured to the ends of the shaft 76. A double clevis member 82 is provided on the link 68 to receive the lower end of an arm 83 projecting downward from the casting 79. A pin 83' pivotally supports the lower end of the arm 83 within the clevis 82. A seat 84 is provided for the camera operator and is supported by an arm 84' which terminates in a downwardly extending stud 85 secured thereto as by a pin 85' (Fig. 14). A series of spaced holes 86 is provided along the length of the stud 85, each of which is adapted to receive therein a transversely extending pin 87. The upper surfaces of the sockets 80, 80a, and 80b are provided with serrated faces 88 which are adapted to be secured with a similar serrated face 89 provided on the lower portion of a sleeve member 90. The upper face of the member 90 has a pair of diametrically opposed notches 91 into which the extending ends of the pin 87 rest. Thus it may be seen that vertical adjustment of the seat 82 may be accomplished by inserting the pin 87 within any one of the holes 86. Also, angular adjustment of the seat 82 in a horizontal plane may be effected by lifting the sleeve 90 from engagement with the serrated edge of the socket, i. e. 80, and rotating it to the desired position. If this angular adjustment of the seat 82 is insufficient to bring the seat in line with the camera 72, the stud 85 may be withdrawn from the socket 80 and placed within any of the other sockets 80a, 80b. If it is desired to allow the seat 84 to swing freely in a horizontal plane one or more washers (not shown) may be interposed between the serrated faces 88 and 89 thus preventing a locking engagement.

Counterbalancing arrangement

Referring now to Figs. 4 and 6, a pair of drums or sheaves 92 and 93 are rigidly secured to the shaft 32 on either side of the gears 37 and 39. Cables 94 and 95 are provided which have one of their ends secured as at 97 and 98 to the sheaves 92 and 93. The other ends of the cables 94 and 95 are brought around pulleys 99 and 100 and thence are secured by means of clamps 101 and 102 to the ends of a pair of spring anchors 103 and 104. The pulleys 99 and 100 are rotatably secured to downwardly extending bosses 105 and 106 (Fig. 8) projecting from the rear end of the main body casting 1.

Figure 13:
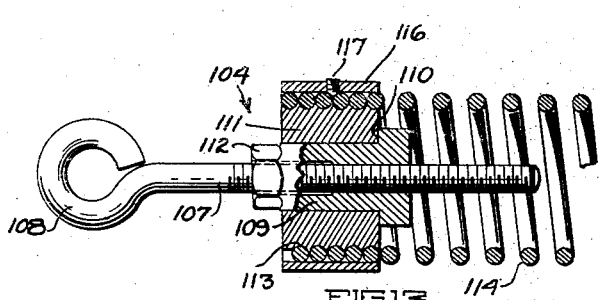
Fig. 13 is a sectional view through one of the anchoring devices for securing the ends of the counter-balancing springs and is taken along the line 13—13 of Fig. 4.

Referring now to Fig. 13, each of the anchoring devices 103 and 104 comprises a threaded rod 107 having an eye 108 at its rear end to engage either of the cables 95 and 96. A threaded member 109 is adjustably secured along the threaded portion of the rod 107 and has a shoulder 110 at its forward end which engages a sleeve 111. A hexagonal face 112 provided on the opposite end of the member 109 allows this member to be adjusted by means of a wrench or other suitable tool. The outer surface of the sleeve 111 is provided with a helical groove 113. The ends of either of a pair of counterbalancing springs 114 and 115 are threaded onto the helical groove 113. An external sleeve 116 is forced over the outer surface of the ends of the springs 114 and 115 to thus clamp them in the grooves 113. A set screw 117 may be provided to hold the sleeve 116 in position. The other ends of the counterbalancing springs 114 and 115 are held within similar anchoring devices 118 and 119 suitably secured to the forward end of the main casting 1. Thus it will be seen that the springs 114 and 115 counterbalance the weight of both the camera and the camera man and allow a steady movement of the camera in a vertical direction.

Steering arrangement

Referring to Figs. 4 and 9, the front wheels 134 and 135 are journaled upon spindles 136 and 137 having at their inner ends vertical apertures 136' and 137' to receive king pins 138 and 139. Brackets 140 and 141 are secured to the flanges 2 and 3 of the main casting 1 as by bolts 142.

The outer portions of each of the brackets 140 and 141 are provided with lugs 143 and 144 having bearings therein to receive the ends of the king pins 138 and 139. Pins 145 are provided to secure the king pins 138 and 139 to their respective spindles 136 and 137.

The rear wheels 146 and 147 (Fig. 8) are journaled upon similar spindles 148 and 149 having vertical apertures 150 and 151 at their inner ends. King pins 152 and 153 rotatably support the spindles 148 and 149 within the U-shaped ends of an axle 154. Axle 154 is secured at its center to a transversely extending tubular shaft 155 which is journaled at either end within bearings 156 and 157 (Figs. 1 and 4) secured to the under surface of the main casting 1. Thus it will be seen that a three point suspension is provided to allow for any unevenness of the surface over which the wheels are to be moved.

As was stated before, one of the features of the invention is to selectively steer either the rear wheels or both the rear and the front wheels. This is accomplished as follows: The rear king pins 148 and 149 (Fig. 4) have securely mounted thereto arms 158 and 159 as by pins 158' and 159'. A tie rod 160 pivotally connects the free ends of the arms 158 and 159 to provide parallel movement of the wheels 146 and 147. The central portion of the link 150 has a clevis member 161 to which is pivotally secured the end of an arm 162 which in turn is rigidly secured to the bottom of a downwardly extending stub shaft 163. By a pin 163' (Fig. 8) the shaft 163 is journaled within a vertically extending bearing provided through the axle 154 and tubular shaft 155. A sleeve 164, secured to the upper end of the shaft 163, has a horizontal shaft 165 journaled therein, the ends of which are secured as by pins 166 to a yoke member 167 of a handle 168. Steering of the rear wheels is thus accomplished by rotating the handle 168 about the axis of the shaft 163.

The front king pins 138 and 139 are similarly secured to arms 169 and 170 having a tie rod 171 connected between their outer ends to provide parallel turning movement. The arm 170 also has a projection 172 at right angles thereto to which is pivotally connected the end of a rod 173.

Referring now to Figs. 4, 15, and 16, the rearward end of the rod 173 has a bracket 174 extending to one side thereof having a locking arrangement 175 thereon (Fig. 16). The locking arrangement 175 is adapted to secure the rearward end of the bracket 174 to either end of a slotted arm 176 formed on the arm 159 and at right angles thereto. The slot 176' of the arm 176 is provided at either end with a conical surface 177 in which is adapted to seat a similar conical face 178 of a sleeve member 179. Sleeve 179 is secured within an aperture provided in the bracket 174 (Fig. 16). A shoulder 180 provided on the interior of the sleeve 179 forms a seat for a compression spring 181. The other end of the spring 181 engages a washer 182 secured to one end of a bolt 183 as by a nut 184. The head 185 of the bolt 183 engages the lower surface of the arm 176 and urges the conical surface 178 of the sleeve 179 into engagement with the conical surface 177 by means of the spring 181 to prevent disengagement under normal circumstances. When a handle 187 provided upon rod 173 is grasped and sufficient pressure applied thereto the conical faces 177 and 178 may be disengaged to allow the sleeve member 179 to be slid along the slot 176′ to a similar conical face provided on the opposite end of the slot.

When only the rear wheels are to be used for steering the camera dolly, the rod 173 is brought into the position shown by the full lines of Figs. 4 and 15. Thus it will be seen that regardless of the angular movement of the wheels 146 and 147, there will be no longitudinal movement of the rod 173 and consequently, no turning movement of the front wheels.

When it is desired to move both the front and rear wheels to produce lateral or canting movement of the camera dolly, the rod 173, through the handle 187, is moved into the dotted line position, shown in Fig. 4. In this position, the rotation of the arm 159 will impart a longitudinal movement to the rod 173 and thus turn the front wheels 134 and 135 in parallel relation with the rear wheels 146 and 147.

Fifth wheel attachment

Figure 11:
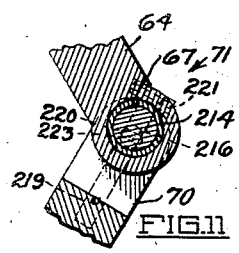
Fig. 11 is a transverse sectional view of the eccentric arrangement for adjusting the camera plate about its horizontal axis and is taken along the line 11—11 of Fig. 10.

When it is desired to turn the camera dolly within a very small radius, a fifth wheel arrangement generally indicated at 188 (Figs. 2 and 5) may be used. A casting 189 is adapted to be secured to the rearward flange 190 of the main casting 1 as by bolts 191 and 192. A central portion of the casting 189 is provided with vertical sleeve 193 formed integrally thereon which receives a second sleeve 194 having its internal diameter threaded as at 195. A vertical shaft 196 is journaled within a bearing member 197 having a threaded portion 198 in engagement with the threaded portion 195 of the sleeve 194. A hand wheel 256 is provided at the upper end of the member 197 and is secured thereto as by bolts 199. Rotation of the hand wheel 256 causes vertical movement of the member 197 and shaft 196, through the threaded portion 195, to thus move a pair of wheels 200 and 201 into engagement with the surface of the floor as shown by the line 202. A shaft 203 having its ends journaled within the wheels 200 and 201 has a yoke 204 carried thereby. Yoke 204 in turn is pivotally secured through a shaft 205 to the ends of a second yoke 206. Yoke 206 is securely mounted as by a key 207 to the lower portion of the shaft 196. A thrust bearing 208 is provided between the lower end of the member 197 and the shoulder of the yoke 206. The upper portion of the shaft 196 has a bracket 209 secured thereto in which is journaled a horizontal shaft 210 having a yoke 211 provided thereon similar to the yoke 167. A second handle 212 may be secured to the clevis 211 to effect rotation of the wheels 200 and 201 about a vertical axis. When the fifth wheel arrangement is to be used, the hand wheel 256 is rotated until a flange 197′ on the upper part of the member 177 strikes the upper surface of the sleeve 194 so as to support the rear end of the camera dolly upon the wheels 200 and 201 and thus raise the wheels 146 and 147 out of engagement with the surface of the floor. When the dolly is in this position, it will be seen that the camera plate 63 will be thrown off its horizontal position. Although this may be compensated for by tilting the camera freehead, it would not be possible to pan the freehead in a horizontal plane. In order to compensate for this offsetting of the camera plate 63, I provide the eccentric arrangement 71′ (Figs. 10 and 11). An eccentric spindle 214 having its main body journaled within the bearing 67 provided in the yoke 64 has eccentric bearing portions 215 and 216 on either side thereof which are journaled within the clevis 70 of the link 68. A handle 217 on the eccentric portion 215 allows for rotation of the eccentric to thus change the position of the camera plate 63 in relation to the link 68. A locking arrangement generally indicated at 218 is provided to lock the eccentric in either of two positions. A lever 219 having an ear 220 provided intermediate its ends is pivotally secured at 221 to the clevis 70. The other end of the lever 219 is engaged by tension spring 222 to urge the ear 220 into engagement with a horizontal slot 223 provided on the end of the eccentric portion 216 of the eccentric 214.

Miscellaneous

At times it may be desired to elevate the camera dolly above the floor or to change the horizontal position of the dolly as for example when it is resting upon an inclined surface. For this reason, I employ jacks 224, 225, 226, and 227 near each of the corners of the camera dolly. The rear jacks 224 and 225 (Fig. 5) comprise threaded rods 228 and 229 having feet 230 and 231 thereon. The rods 228 and 229 are threaded within brackets 232 and 233 provided on either side of the casting 189. The upper ends of the rods 228 and 229 have hand wheels 228′ and 229′ provided thereon by means of which the jack may be rotated so as to raise the rear end of the camera dolly. The jacks 226 and 227 at the front of the dolly (Figs. 4 and 9) are similar to those of 224 and 225 and are rotatably mounted within apertures provided in the brackets 140 and 141.

Referring to Figs. 3 and 17 a pair of telescopic handles 234 and 235 are provided at the base of arm 14 which, when in extended position, are adapted to be grasped by the camera dolly operator to facilitate movement of the dolly along the floor. The handles are slidably supported in a tubular casing 236 which is suitably secured to the upper surface of arm 14. Split sleeve arrangements 237 and 238 are formed at either end of the casing 236 and are provided with clamping screw members 239 and 240, respectively, whereby the handles 234 and 235 may be locked in any desired position.

Referring now to Fig. 18, adjustable foot rests 241 for the camera operator are provided at either side of the arm 14 and are secured to either of the flanges 15 and 16. A hollow shaft 242 is keyed within an enlarged bearing portion 243 extending transversely within the flange 15. The outer end of the shaft 242 has a serrated face 244 thereon which is adapted to be engaged by a similar serrated face provided within a bore 245 formed within a step member 246. An internal threaded portion 247 of the tubular shaft 242 is engaged by a bolt 248 having a knob 249 on the end thereof. When the step is to be adjusted, the knob 249 is rotated so as to withdraw the bolt an amount sufficient to allow the serrated faces 244 to be disengaged and the step rotated. The knob 249 is then rotated to clamp the serrated faces 244 into engagement. The opposite end of the bolt 248 has a screw 249 having an enlarged head thereon secured thereto to prevent complete withdrawal of the bolt 248 from the tubular shaft 242.

Having thus described the invention, what is claimed as new and desired to secure by Letters Patent is:

1. A camera dolly comprising a frame, a load supporting member pivotally mounted on said frame, a power arm connected to said load member, means for applying power to said power arm to raise said load member, a drum, an operative connection between said drum and said load member, a cable having one end thereof around said drum, and a counterbalance spring connected between the other end of said cable and said frame.

2. In a camera dolly, a frame, a load member pivotally carried by said frame, means including a worm and worm wheel for raising one end of said load member, a sheave operatively connected to said worm wheel, a spring anchored at one end thereof to said frame, and a cable secured at one end thereof to the other end of said spring and having the other end thereof around said sheave.

3. In a camera dolly, a frame, a load member pivotally carried by said frame, means including a self locking worm and worm wheel for raising one end of said load member, a sheave operatively connected to said worm wheel, a spring anchored at one end thereof to said frame, and a cable secured at one end thereof to the other end of said spring and having the other end thereof around said sheave.

4. A camera dolly comprising a frame having horizontal portions, a load supporting arm pivotally connected to said frame, a camera supporting member pivotally connected to said arm, a link pivotally connected to said frame and said camera supporting member in parallel relation to said arm adapted to maintain said camera supporting member parallel with said frame in all positions of said supporting arm, a seat supported by said arm, and means whereby said seat is maintained parallel to the horizontal portions of said frame.

5. A camera dolly comprising a frame, a load supporting arm pivotally connected to said frame for movement in a vertical direction, a camera supporting member pivotally connected to said arm for movement in a vertical direction, a link pivotally connected to said frame and said camera supporting member in spaced parallel relationship to said arm, a seat and a seat supporting member pivotally mounted on said arm for movement in a vertical direction and having an extending portion thereof connected to said link whereby said camera supporting member and said seat are adapted to maintain substantially horizontal positions for all positions of said arm.

6. A camera dolly comprising a supporting frame, a camera supporting arm pivotally supported on said frame for movement about a horizontal axis, a camera plate pivotally supported on said arm for movement about a horizontal axis, a seat pivotally supported on said arm for movement about a horizontal axis, and link means between said plate, said seat and said frame for retaining said plate and said seat in parallel relation to said frame in all positions of said arm.

7. A camera dolly comprising a camera supporting arm, means for pivotally supporting said arm for movement about a horizontal axis, a camera plate, bearing means for pivotally supporting said camera plate on said arm for movement about a horizontal axis, a seat, bearing means for pivotally supporting said seat on said arm for movement about a horizontal axis, projections depending from said seat and said camera plate, and link means fixed at one end in respect to said axis and connected at the other end to said projections.

8. In a camera dolly, a supporting frame, a load supporting arm, a shaft carried by said frame and rotatably supporting said arm for movement about a horizontal axis, means including a plurality of gears for raising and lowering said arm, a shaft for one of said gears in spaced relation to said first mentioned shaft and carried by said frame, a link journaled on both of said shafts, a drive shaft for one of said gears, and means on said link for rotatably supporting said last mentioned shaft.

9. A camera dolly comprising a supporting frame, a load supporting arm, a shaft carried by said arm for rotatably supporting said arm for movement about a horizontal axis, means including a plurality of gears for raising and lowering said arm, a shaft for one of said gears in spaced relation to said first mentioned shaft, means for supporting said last mentioned shaft on said frame, a link carried by both of said shafts, a drive shaft for one of said gears, means on said link for rotatably supporting said last mentioned shaft, a camera plate pivotally supported on said arm for movement about a horizontal axis, and link means between said camera plate and said first mentioned link for retaining said camera plate in substantially the same angular relation to said supporting frame for all positions of said arm.

10. A camera dolly comprising a frame, means for supporting said frame from a horizontal supporting surface, a camera supporting arm, a pivotal connection between said frame and one end of said arm for permitting movement of said arm about a horizontal axis, means on the opposite end of said arm for supporting a camera, means for moving said arm about said horizontal axis, said frame having a channel therein at the forward end thereof to receive said arm when said arm is in its lowermost position whereby the camera supporting end of said arm may be brought adjacent said supporting surface, a pair of extensible springs on either side of said channel and each secured at its forward end to the forward end of said frame, a pair of sheaves operatively connected to said arm, and a cable interconnecting said sheaves with the rear ends of said springs to counterbalance said arm.

11. A camera dolly comprising a chassis, front and rear wheels for supporting said chassis from a supporting surface, said chassis having a frame extending between said front wheels, a camera supporting arm extending over said frame and beyond said front wheels, means for pivotally supporting said arm on said frame for movement about a horizontal axis, said frame comprising a U shaped channel member having vertical side flanges, a bearing bracket for each of said front wheels each mounted on one of said side flanges, said channel member having a depressed central portion permitting lowering of the forward end of said arm to a point adjacent said supporting surface.

12. A camera dolly comprising a supporting frame, a camera supporting arm, means for pivotally supporting said arm at one end thereof on said frame for movement about a horizontal axis, means on the opposite end of said arm adapted to support a camera, means comprising a plurality of gears for raising and lowering said arm, a supporting shaft for one of said gears, a pair of sheaves on said shaft on either side of said gear and secured in driving relation to said gear, a pair of extensible springs each secured at one end thereof to said frame, and a pair of cables each connected at one end thereof to the unsecured end of a respective one of said springs and having a portion thereof wrapped around a respective one of said sheaves.

13. A camera dolly comprising a frame, a camera supporting arm, means on said frame for pivotally supporting said arm for movement about a horizontal axis, means including a plurality of gears for raising and lowering said arm, a sheave operatively connected to one of said gears, an extensible spring parallel with said frame, means for securing one end of said spring to said frame adjacent one end of said frame, a pulley carried by said frame adjacent the opposite end of said frame, and a cable secured to the opposite end of said spring and extending around said pulley, said cable having a portion thereof wrapped around said sheave to counterbalance said arm.

ALBERT W. TONDREAU.